July 11, 1944.　　　O. CONRADTY ET AL　　　2,353,444
CONNECTION OF CARBON BODIES
Filed Sept. 4, 1940
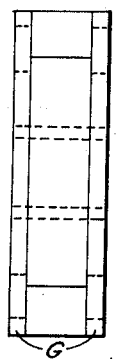
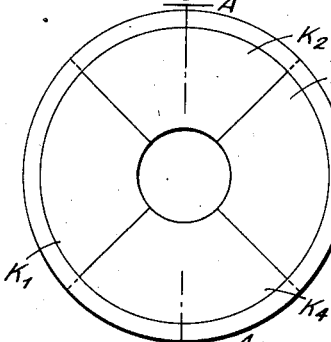
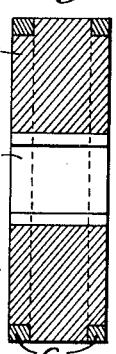
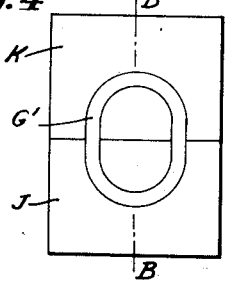
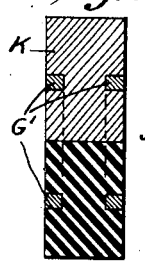
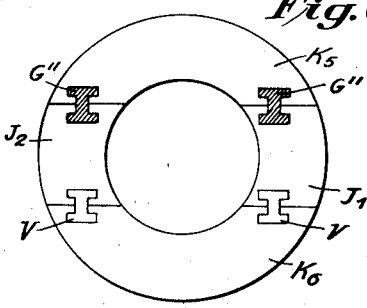
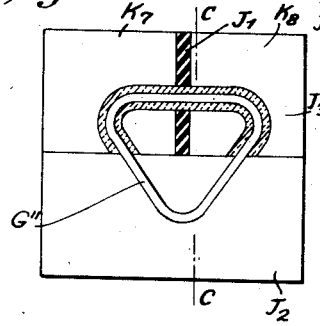
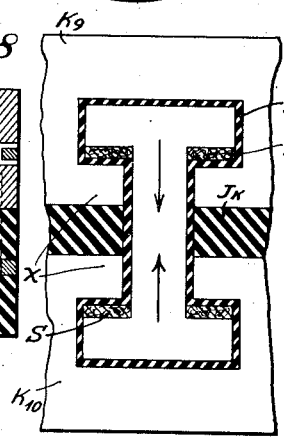
Inventors
OTTMAR CONRADTY AND
HANS ZÖLLNER
By *Alubtoleoul*
Attorney.

Patented July 11, 1944

2,353,444

UNITED STATES PATENT OFFICE 2,353,444

CONNECTION OF CARBON BODIES

Ottmar Conradty, Rothenbach-on-the-Pegnitz, and Hans Zöllner, Lauf-on-the-Pegnitz, Germany; vested in the Alien Property Custodian Application September 4, 1940, Serial No. 355,390
In Germany August 10, 1939

6 Claims. (Cl. 171—325)

This invention relates to a method and system for connecting constructional parts of artificial carbon with each other or with insulating members.

The present invention is particularly directed to carbon collector rings as well as carbon brushes, slip ring devices and the like for electrical machines, as they are extensively used today in a considerable number of different types of electrical devices.

It is an important object of the present invention to provide means and methods for establishing a strong, rigid and reliable connection between carbon bodies and adjacent parts, for instance, in contact devices, contact brushes, slip ring devices, collectors, contact hoops, and the like.

Another object of the invention is to create a reliable electrical contact between a carbon body and an adjacent body of carbon or another electrically conductive material.

With these and further objects in view, as may become apparent from the within disclosures, the invention consists not only in the structures herein pointed out and illustrated by the drawing, but includes further structures coming within the scope of what hereinafter may be claimed.

The character of the invention, however, may be best understood by reference to certain of its structural forms, as illustrated by the accompanying drawing in which—

Fig. 1 is a side view of a composite carbon body having the invention applied thereto.

Fig. 2 is a front elevation of the same body.

Fig. 3 is an axial section through this body.

Fig. 4 is a plan view of a composite body comprising a carbon portion and an insulating portion.

Fig. 5 is a section on line B—B of Fig. 4.

Fig. 6 is an elevation of another composite ring.

Fig. 7 is an elevation of still another composite body.

Fig. 8 is a section on line C—C of Fig. 7.

Fig. 9 is a fragmentary view of a composite body including cushion or bolster members.

Similar characters of reference denote similar parts in the different views.

As herein shown, we connect the carbon parts with each other or with third bodies of insulating or conductive nature by means of metal casting. To this end, the parts are made in the appropriate shape, assembled or composed, held or clamped together by auxiliary clamping tools and then shrunken together by a metal casting operation. The metal casting may embrace the parts or engage into grooves or recesses thereof. It is also possible, depending on the shape and use of the composite body, to provide the metal casting merely for overlapping abutting faces of the parts.

Cushions or bolsters in the form of metal texture or the like may be embodied in the joint to compensate the shrinkage pressure. Moreover, where insulation is required, insulating material may be interposed for separating the carbon parts electrically from the metal casting. To this end, refractory or heat resistant insulating material should be used, or the insulating material should be protected from the heat of the molten metal by insertion of a heat-insulating material, which may be a material constituting a shrinkage compensating bolster at the same time. Texture or wool, for example, glass wool may be used for this purpose. It will be appreciated that it is thus possible to take up the major portion of shrinkage by compression of the loose texture, while the last stage of shrinking causes reliable engagement of the casting with the work piece without causing stresses in excess of the strength of the carbon material.

Referring now to the drawing in greater detail, and first to Figs. 1 to 3, it will be noted that four carbon sectors $K_1$, $K_2$, $K_3$, $K_4$ make up a ring body, being in direct electrical contact at their abutting faces, without the interposition of insulating material, while the intimate joint between the four segments is established by means of two metal rings G cast into recesses which have been provided on the circular edges of the carbon segments, the material G being applied in the form of a molten mass which owing to its shrinkage in cooling down holds the carbon segments together in the form of a rigid body and, moreover, helps to ensure electrical contact between the parts.

Referring to Figs. 4 and 5, a carbon portion K and an insulating portion J are held together by metal rings G' cast into annular grooves on one or more faces of the composite body. Again, a solid, resistant integral body is formed by shrinkage of the metal rings G'. No intermediate insulation is provided in this case between the carbon and the metal casting.

In the embodiment shown in Fig. 6, two annular carbon segments $K_5$ and $K_6$ are made up to a composite ring together with two insulating segments $J_1$ and $J_2$ by which the carbon segments are electrically insulated from each other.

T-shaped recesses V in the carbon and insulating segments, forming together a double-T, are filled up with a molten metal G" which on solidification clamps the segments tightly together, creating a resistant integral ring. Again, no insulation is required between the carbon and metal bodies, since the counterpart of the metal clamp is engaged in insulating material.

Figs. 7 and 8 illustrate an arrangement in which two carbon bodies $K_7$ and $K_8$, insulated from each other by an intermediate insulating layer $J_1$, are joined with a common insulating socket $J_2$. It would be possible to connect the two carbon bodies separately to the insulating body, in the manner illustrated in Fig. 6, but in many instances a connection may be preferable by means of a continuous ring casting G" applied in a groove as shown. In this case, it is required to insulate the casting from the carbon bodies $K_7$ and $K_8$ by means of an intermediate insulating layer $J_3$ which should be heat resistant or include a heat resistant material to afford a protection against the destructive effects of the molten cast metal.

Fig. 9 shows a joint of the general type indicated in Fig. 6, including a double-T-clamp connecting two carbon bodies $K_9$ and $K_{10}$, between which an insulating layer $J_K$ is provided. In order to avoid excessive stresses in the regions X which are exposed to the action of the shrinking forces indicated by the arrows, a loose shrinkage bolster or padding S has been provided for defining the hollow space to be filled up. On cooling down of the cast metal, the padding S is compressed in the direction of the arrows, thereby reducing the pressure upon the carbon parts to a safe amount. Moreover an intermediate insulating layer $J_z$ has been provided to prevent electrical contact between the carbon bodies $K_9$ and $K_{10}$ and the double-T-casting.

By the term "artificial carbon" mentioned in this description, it is understood to mean a product made of carbon particles pressed or molded together with or without a binder to form a certain configuration.

The method and apparatus of the present invention have been described in detail with reference to specific embodiments. It is to be understood, however, that the invention is not limited by such specific reference but is broader in scope and capable of other embodiments than those specifically described and illustrated in the drawing.

We claim:

1. A composite body comprising at least one shaped part of artificial carbon material, at least one second part making up the composite body together with said carbon part, and a metal casting engaged into the abutting faces of said parts and holding said parts in tight engagement with each other by its shrinkage pressure.

2. A composite body comprising at least one shaped part of artificial carbon material, at least one second part making up the composite body together with said carbon part, a metal casting in and holding said parts in tight engagement with each other by its shrinkage pressure, and a metal texture member interposed between said carbon part and said metal casting, for compensation of any excess shrinkage pressure.

3. A composite body comprising at least one shaped part of artificial carbon material, at least one second part making up the composite body together with said carbon part, a metal casting holding said parts in tight engagement with each other by its shrinkage pressure, and insulating layers between said parts and said metal casting.

4. A composite body comprising at least one shaped part of artificial carbon material, at least one second part making up the composite body together with said carbon part, a metal casting holding said parts in tight engagement with each other by its shrinkage pressure, and heat-resistant insulating layers between said parts and said metal casting.

5. A composite body comprising at least one shaped part of artificial carbon material, at least one second part making up the composite body together with said carbon part, a metal casting in and holding said parts in tight engagement with each other by its shrinkage pressure and insulating layers between said parts and said metal casting, said insulating layer including heat resistant filaments forming a loose structure, for protecting the insulating layer and for compensating any excess shrinkage pressure.

6. A composite body comprising at least one shaped part of artificial carbon material, at least one second part making up the composite body together with said carbon part, a metal casting holding said parts in tight engagement with each other by its shrinkage pressure, and insulating layers between said parts and said metal casting, said insulating layers including heat-resistant inserts.

OTTMAR CONRADTY.
HANS ZÖLLNER.